United States Patent
Sugiyama et al.

(10) Patent No.: US 7,059,363 B2
(45) Date of Patent: Jun. 13, 2006

(54) METHOD OF SUPPLYING DIVIDED GAS TO A CHAMBER FROM A GAS SUPPLY APPARATUS EQUIPPED WITH A FLOW-RATE CONTROL SYSTEM

(75) Inventors: Kazuhiko Sugiyama, Minato-ku (JP); Nobukazu Ikeda, Nishi-ku (JP); Kouji Nishino, Nishi-ku (JP); Ryosuke Dohi, Nishi-ku (JP); Toyomi Uenoyama, Nishi-ku (JP)

(73) Assignees: Fujikin Incorporated, Osaka (JP); Tokyo Electron Ltd., Tokyo (JP)

( * ) Notice: Subject to any disclaimer, the term of this patent is extended or adjusted under 35 U.S.C. 154(b) by 177 days.

(21) Appl. No.: 10/495,641

(22) PCT Filed: Jan. 20, 2003

(86) PCT No.: PCT/JP03/00437

§ 371 (c)(1),
(2), (4) Date: May 17, 2004

(87) PCT Pub. No.: WO03/102707

PCT Pub. Date: Dec. 11, 2003

(65) Prior Publication Data

US 2005/0005994 A1    Jan. 13, 2005

(30) Foreign Application Priority Data

Jun. 3, 2002    (JP) .............................. 2002-161086

(51) Int. Cl.
*B65B 1/04* (2006.01)

(52) U.S. Cl. .............................. 141/1; 141/94; 141/192; 137/487.5; 137/486

(58) Field of Classification Search .............. 141/1, 141/67, 94, 192; 137/487.5, 486; 700/282; 702/50

See application file for complete search history.

(56) References Cited

U.S. PATENT DOCUMENTS 6,848,470 B1 * 2/2005 Ohmi et al. .............. 137/487.5
6,934,643 B1 * 8/2005 Kar et al. ...................... 702/50

FOREIGN PATENT DOCUMENTS

| JP | 8-64490 A | 3/1996 |
| JP | 08338546 A2 | 12/1996 |
| JP | 11063265 A2 | 3/1999 |
| JP | 2000-305630 A | 11/2000 |

OTHER PUBLICATIONS

International Search Report, completed Mar. 28, 2003 of PCT/JP03/00437.
* cited by examiner

*Primary Examiner*—Steven O. Douglas
(74) *Attorney, Agent, or Firm*—Griffin & Szipl, P.C.

(57) ABSTRACT

A method for supplying a specified quantity Q of processing gas while dividing at a desired flow rate ratio $Q_1/Q_2$ accurately and quickly from a gas supply facility equipped with a flow controller into a chamber. When a specified quantity Q of gas is supplied while being divided at a desired flow rate ratio $Q_1/Q_2$ from a gas supply facility equipped with a flow controller into a reduced pressure chamber C through a plurality of branch supply lines and shower plates fixed to the ends thereof, pressure type division quantity controllers $FV_1$ and $FV_2$ are provided in the plurality of branch supply lines $GL_1$ and $GL_2$. Opening control of both division quantity controllers $FV_1$ and $FV_2$ is started by an initial flow rate set signal from a division quantity control board FRC for fully opening the control valve CV of the pressure type division quantity controller having a higher flow rate and pressures $P_3'$ and $P_3''$ on the downstream side of the control valve CV are regulated thus supplying a total quantity $Q=Q_1+Q_2$ of gas while dividing into the chamber C through orifice holes ($3a$, $4a$) made in shower plates (3, 4) at desired division quantities $Q_1$ and $Q_2$ represented by formulas $Q_1=C_1P_3'$ and $Q_2=C_2P_3''$ (where, $C_1$ and $C_2$ are constants dependent on the cross-sectional area of the orifice hole or the gas temperature on the upstream side thereof).

10 Claims, 8 Drawing Sheets

METHOD OF SUPPLYING DIVIDED GAS TO A CHAMBER FROM A GAS SUPPLY APPARATUS EQUIPPED WITH A FLOW-RATE CONTROL SYSTEM

This is a National Phase Application in the United States of International Patent Application No. PCT/JP03/100437 filed Jan. 20, 2003, which claims priority on Japanese Patent Application No. 2002-161086, filed Jun. 3, 2002. The entire disclosures of the above patent applications are hereby incorporated by reference.

FIELD OF THE INVENTION

The present invention relates to an improved method of gas supply for supplying automatically divided gas to a chamber from a gas supply apparatus equipped with a pressure-type flow-rate control system for use in semiconductor manufacturing at semiconductor manufacturing facilities and the like.

BACKGROUND OF THE INVENTION

The so-called "pressure-type" flow-rate control system has been widely employed for the purpose of controlling the flow rate of gas to be supplied to semiconductor manufacturing facilities.

FIG. 7 illustrates an example of a situation where a treatment gas G is supplied to a chamber C for forming silicone dioxide films by employing a pressure-type flow-rate control system FCS. The treatment gas G, which has a prescribed flow-rate Q, is supplied via the pressure-type flow-rate control system FCS into the chamber C at reduced pressure using a vacuum pump Vp, and is delivered at flow rate Q through a gas discharger D onto a wafer H placed on a supporting device I.

On the other hand, said pressure-type flow-rate control system FCS operates on the basis of the theory that when $P_1 >$ approximately $2 \times P_2$, a critical expansion pressure condition, is maintained, the flow rate Q of gas passing through an orifice L is determined only by the gas pressure $P_1$ on the upstream side of the orifice, and the relation is expressed by the equation: $Q = CP_1$ (where C is a constant determined by the calibre of the orifice L and the gas temperature). As a result, the flow rate Q on the downstream side of the orifice can be maintained at a desired set value by adjusting said pressure $P_1$ with a control valve CV.

Referring to FIG. 7, $P_0$ indicates the supply pressure of the treatment gas G, $P_M$ a pressure meter, F a filter, CPU a central processing unit, Qs an input signal for setting the flow rate, and Qe an output signal for the control flow rate.

The pressure-type flow-rate control system is disclosed in Toku-Kai-Hei 8-338546 and 11-63265. Accordingly, a detailed explanation is omitted here.

With regard to said pressure-type flow-rate control system FCS, it is a prerequisite, as stated above, that the gas pressure $P_1$ on the upstream side of the orifice, and the gas pressure $P_2$ on the downstream side of the orifice satisfy the aforementioned critical expansion pressure condition. Hence, it is a disadvantage of the pressure-type flow-rate control apparatus FCS that when the gas pressure $P_2$ on the downstream side of the orifice rises greatly and disproportionately compared with the gas pressure $P_1$ on the upstream side of the orifice, the critical expansion pressure condition is no longer satisfied, making it impossible to control the flow rate.

Furthermore, when the pressure $P_2$ on the downstream side of the orifice rises, and $P_1/P_2$ approaches the limit value of the above-mentioned critical expansion pressure condition, the accuracy of flow rate control actually decreases. As a result, there is a problem in that the practical range for flow rate control is limited when the pressure $P_2$ on the downstream side of the orifice increases.

As described above, it is noted that numerous problems arise in connection with gas flow rate control using a pressure-type flow-rate control system when the pressure $P_2$ on the downstream side of the orifice L increases. On the other hand, according to the pressure-type flow-rate control system, the use of a pressure-type flow-rate control system FCS makes it possible to control accurately with ease the gas flow rate of the gas supply to the chamber. In addition, it is unnecessary to install an additional high precision pressure adjustment device at the gas supply source, thereby permitting a great reduction in the cost of the gas supply device, which is an excellent practical advantage.

On the other hand, it is to be noted that recently there has been a trend for the outer diameter of a silicone wafer for use in manufacturing a semiconductor to become larger and larger. By way of example, if the outer diameter of the wafer H is 300 mm φ, then it is necessary for the volumes of the treatment gas supplied to the centre part of the wafer and the peripheral part (or edge part) of the wafer to be individually adjusted.

To meet this requirement, if the treatment gas supply to said centre part and the treatment gas supply to said peripheral part are effected by separate supply lines $GL_1$ and $GL_2$ as shown in FIG. 8, then the treatment gas can be supplied without difficulty at the prescribed flow rates $Q_1$ and $Q_2$ from the gas supply source S by the gas supply lines $GL_1$ and $GL_2$, both of which are provided with a pressure-type flow-rate control system FCS.

However, it is not recommended that gas be supplied to a single chamber C using gas supply lines $GL_1$ and $GL_2$ having independent pressure-type flow-rate control systems $FCS_1$ and $FCS_2$ respectively, because the semiconductor manufacturing equipment is then forced to be enlarged, the facility cost increases, and maintenance becomes laborious.

To overcome these problems, it is found more desirable that the two gas supply lines $GL_1$ and $GL_2$ should be split from a single pressure-type flow-rate control system FCS, as shown in FIG. 9, so that the flow rates $Q_1$ and $Q_2$ of the separate gas supply lines $GL_1$ and $GL_2$ can be controlled by adjusting flow rate control valves $V_1$ and $V_2$ installed in the gas supply lines $GL_1$ and $GL_2$ respectively.

On the other hand, the pressure-type flow-rate control system FCS commonly used today for gas supply equipment has flow rate control characteristics which can be used optimally when the pressure $P_2$ downstream of the orifice is in the range 0–100 Torr. Therefore, with the aforementioned pressure-type flow-rate control system FCS, when the pressure $P_2$ downstream of the orifice exceeds approximately 100 Torr, the range of flow rate control is greatly limited with respect to the precision of flow rate control.

For example, referring to FIG. 9, assume that the treatment gas G is supplied at a flow rate of Q=300 SCCM, so that the gas G is supplied to the chamber C at flow rates of $Q_1$=130 SCCM and $Q_2$=170 SCCM through the supply lines $GL_1$ and $GL_2$ respectively. Where the gas supply equipment is not one that employs a pressure-type flow-rate control system FCS, the following method can be employed: That is, both of the control valves $V_1$ and $V_2$ are first closed; next the treatment gas flow rate of the flow-rate control equipment is set at Q=300 SCCM; then the control valves $V_1$ and $V_2$ are adjusted so that both the flow rates $Q_1$ and $Q_2$ can be adjusted to the set values automatically, or by checking with a flow-rate meter (not illustrated).

However, where the gas supply equipment employs a pressure-type flow-rate control system FCS as a flow-rate control system as shown in FIG. 9, it is difficult first to set the flow rate Q (300 SCCM) of the pressure-type flow-rate control system FCS when both of the control valves $V_1$ and $V_2$ are completely closed, and then to adjust swiftly the flow rates $Q_1$ (130 SCCM) and $Q_2$ (170 SCCM) of the respective split supply lines $GL_1$ and $GL_2$ with great precision by adjusting the control valves $V_1$ and $V_2$.

The reason is as follows: If the control valves $V_1$ and $V_2$ are only open to a small extent, then the pressure $P_2$ on the upstream side of the control valves $V_1$ and $V_2$ rises, with the result that the value of $P_1/P_2$ deviates from the limit value of said pressure-type flow-rate control system FCS. As a result, the flow rate Q established by the pressure-type flow-rate control system FCS differs greatly from the set flow rate (Q=300 SCCM).

OBJECT OF THE INVENTION

It is an object of the present invention to provide a method of supplying divided gas to a chamber from a gas supply apparatus equipped with a pressure-type flow-rate control system which solves the above-mentioned problems that are encountered when a gas G at a given flow rate Q, adjusted by the pressure-type flow-rate control system FCS, is divided into split supply lines $GL_1$ and $GL_2$ with set flow-rates $Q_1$ and $Q_2$ according to a conventional method of dividing a gas supply from a gas supply apparatus equipped with a pressure-type flow-rate control system FCS to a chamber C, namely: ① the flow rate Q controlled by the pressure-type flow-rate control system FCS may deviate greatly from the set flow rate with the result that it is extremely difficult to adjust not only the flow rate Q, but also the flow rates $Q_1$ and $Q_2$, if the control method adopted is one in which flow rate control valves $V_1$ and $V_2$ installed in the split supply lines $GL_1$ and $GL_2$ are first closed completely (or almost closed) and then opened gradually; and ② the precision of the flow rate control is low and/or it takes too much time to control the flow rate, even if the flow rates $Q_1$ and $Q_2$ are somehow adjusted. It is, therefore, another object of the present invention to provide a method of supplying divided gas to a chamber from a gas supply apparatus equipped with a pressure-type flow-rate control system in which gas at a predetermined flow rate Q can be quickly divided and supplied at a desired ratio $Q_1/Q_2$ with great precision, even if the gas is divided and supplied from a gas supply apparatus equipped with a pressure-type flow-rate control system FCS.

DISCLOSURE OF THE INVENTION

To achieve the above stated object, the inventors of the present invention have rejected the conventional method used in divided gas supply control for this type of gas supply apparatus in which respective flow-rate control valves $V_1$ and $V_2$ installed in split lines are gradually opened from being completely closed (or almost completely closed), and have instead adopted a novel method in which the flow-rate control valves $V_1$ and $V_2$ are closed stepwise from being initially fully open (or almost fully open), so that the flow rates $Q_1$ and $Q_2$ of the split supply lines $GL_1$ and $GL_2$ can be adjusted to a desired flow rate ratio $Q_1/Q_2$ quickly and with precision, while the overall flow rate Q is controlled with precision by means of the pressure-type flow-rate control system FCS. The inventors have conducted many experiments on the supply of divided gas on the basis of the above-mentioned novel method.

The present invention has been devised on the basis of the aforementioned finding, and also on the results of the experiments on the dividing of gas. The present invention as claimed in claim 1 relates to a method of supplying divided gas, characterised in that gas G with a set flow rate Q is supplied to a chamber C at a prescribed flow rate ratio $Q_1/Q_2$ from a gas supply apparatus 1 equipped with a flow-rate supply system through a plurality of split supply lines $GL_1$ and $GL_2$ and shower plates fixed to the ends thereof, wherein with split pressure-type flow-rate controllers $FV_1$ and $FV_2$ installed in said split supply lines $GL_1$ and $GL_2$, control of the patency of said split flow-rate controllers $FV_1$ and $FV_2$ is initiated by means of an initial flow-rate setting control signal from a divided flow-rate control board FRC, causing the control valve CV of the split pressure-type flow-rate controller with the greater flow rate to open to its full extent, and the desired split flow rates $Q_1$ and $Q_2$ are supplied through orifices 3a and 4a installed in said shower plates 3 and 4 by adjusting the pressures $P_3'$, $P_3''$ on the downstream sides of the control valves CV, the flow rates $Q_1$ and $Q_2$ being expressed by the formulae $Q_1=C_1P_3'$ and $Q_2=C_2P_3''$ (where $C_1$ and $C_2$ are constants determined by the sectional areas of the orifice holes 3a and 4a and the gas temperature on the upstream side of the orifices), thereby supplying the total amount $Q=Q_1+Q_2$ into the chamber C.

The invention of claim 2 relates to a method of supplying divided gas to a chamber as claimed in claim 1, wherein said divided flow-rate control board FRC is equipped with a CPU, and is provided with a start and stop signal input terminal $T_2$, an initial flow-rate ratio setting signal input terminal $T_3$, a shower plate combination indicator signal input terminal $T_4$, control flow rate signal output terminals $T_{71}$ and $T_{72}$ for the split pressure-type flow-rate controllers $FV_1$ and $FV_2$, and input/output abnormality alarm output terminals $T_{91}$ and $T_{92}$ for transmitting signals on the basis of the deviation between the flow-rate setting input signals and the control flow rate output signals for the split pressure-type flow controllers $FV_1$ and $FV_2$. With regard to different combinations of shower plates 3 and 4, the pressures $P_3'$, $P_3''$ of gas G flowing downstream of the control valves CV of the split pressure-type flow controllers $FV_1$ and $FV_2$ when the gas G totalling $Q=Q_1+Q_2$ G flows through the shower plates 3 and 4 respectively at the flow rate ratio $Q_1/Q_2$ are calculated from the aforementioned $Q_1=C_1P_3'$ and $Q_2=C_2P_3''$, with the flow rate ratio $Q_1/Q_2$ being a parameter for a plurality of total flow rates Q, and the initial flow-rate setting signal to the split pressure-type flow-rate controller $FV_1$ having the greater flow-rate is an input signal voltage Vo for full opening of the control valve, while the initial flow-rate setting signal to the other split pressure-type flow-rate controller $FV_2$ is the aforementioned $P_3''/P_3' \times Vo$. Next, after an indicator signal corresponding to the combination of said shower plates 3 and 4 and the ratio $P_3'/P_3''$ between the initial flow-rate setting signals for said split pressure-type flow-rate controllers $FV_1$ and $FV_2$ have been inputted respectively to said input terminal $T_4$ and the initial flow-rate ratio setting signal input terminal $T_3$, the flow rate Q of gas G supplied from the gas supply apparatus 1 is set at a desired flow rate with the control valves CV of said split pressure-type flow-rate controllers $FV_1$ and $FV_2$ being fully open. Then, an activation (START) signal is inputted to said start signal input terminal $T_2$ (STEP 5), and when the input of said start signal is confirmed (STEP 6), the existence or non-existence of said shower plate combination indicator signal and said initial flow-rate ratio setting signal is confirmed (STEP 7). Then, the initial flow-rate setting signals Vo, Vo×$P_3''$/$P_3'$ for the split pressure-type flow-rate controllers $FV_1$ and $FV_2$ obtained from said flow-rate ratio setting signal are progressively increased stepwise at the same rate (STEP 8 and STEP 10). The deviation between the current flow-rate setting input signal and the control flow rate output signal is checked (STEP 9). If it is found that the input and output deviation is within a set range, then the flow-rate setting signals to the split flow-rate controllers $FV_1$ and $FV_2$ are reverted to the previous values of the flow-rate setting signals one step before the input-output deviation fell within the set range (STEP 11). The flow-rate setting signals to the split flow-rate controllers $FV_1$ and $FV_2$ are then subjected to a ramp-change at the same rate (STEP 13 and STEP 14), while the deviation between the input and output signals is checked continuously (STEP 15). When it is found that the deviation between the input and output signals registered at the time of the ramp-change is within a set range, the flow-rate setting signals registered at that time are fixed and maintained as the flow-rate setting signals for the split flow-rate controllers $FV_1$ and $FV_2$ (STEP 16), thereby making it possible to effect the divided supply of the gas G under the said flow-rate setting signals.

The invention of claim 3 according to the invention as claimed in claim 2 is carried out such that the stepwise change of the flow-rate setting signals increases both the flow-rate setting signals at the same stepwise rate, from the initial flow rate setting value (100%) by 50%, 30%, 20%, 10%, and then 5%, every 0.5 seconds.

The invention of claim 4 according to the invention as claimed in claim 2 is carried out such that said ramp-change increases both of said flow-rate setting signals at the same rate of 10% every 0.5 seconds.

The invention of claim 5 according to the invention as claimed in claim 2 is carried out such that when the deviation between the input and output remains continuously nil for more than a certain period of time, then the flow-rate setting signals for the time-being are fixed and maintained as the flow-rate signals for the flow-rate controllers $FV_1$ and $FV_2$.

The invention of claim 6 according to the invention as claimed in claim 2 is carried out such that the gas pressures on the downstream side of the split pressure-type flow-rate controllers $FV_1$ and $FV_2$ are kept at or below 100 Torr, the total flow-rate Q is set at 100 sccm~1600 sccm, and the divided flow-rate ratio $Q_1/Q_2$ is 1/4, 1/2, 1/1, 2/1, 3/1, or 4/1.

The invention of claim 7 according to the invention as claimed in claim 1 or claim 2 is carried out such that the initial flow-rate setting signal for the pressure-type divided flow-rate controller $FV_1$ or $FV_2$ having the greater divided flow-rate $Q_1$ or $Q_2$ is a voltage input for full opening of the control valve CV, the control voltage input for full patency of the control valve having the greater divided flow-rate being 0 v, and the range of the control voltage being 0~5V.

The invention of claim 8 according to the invention as claimed in claim 2 is carried out such that the input and output signals to the terminals of the divided flow-rate control board FRC are serial input and output.

LIST OF REFERENCE LETTERS AND NUMERALS

Figure 1:
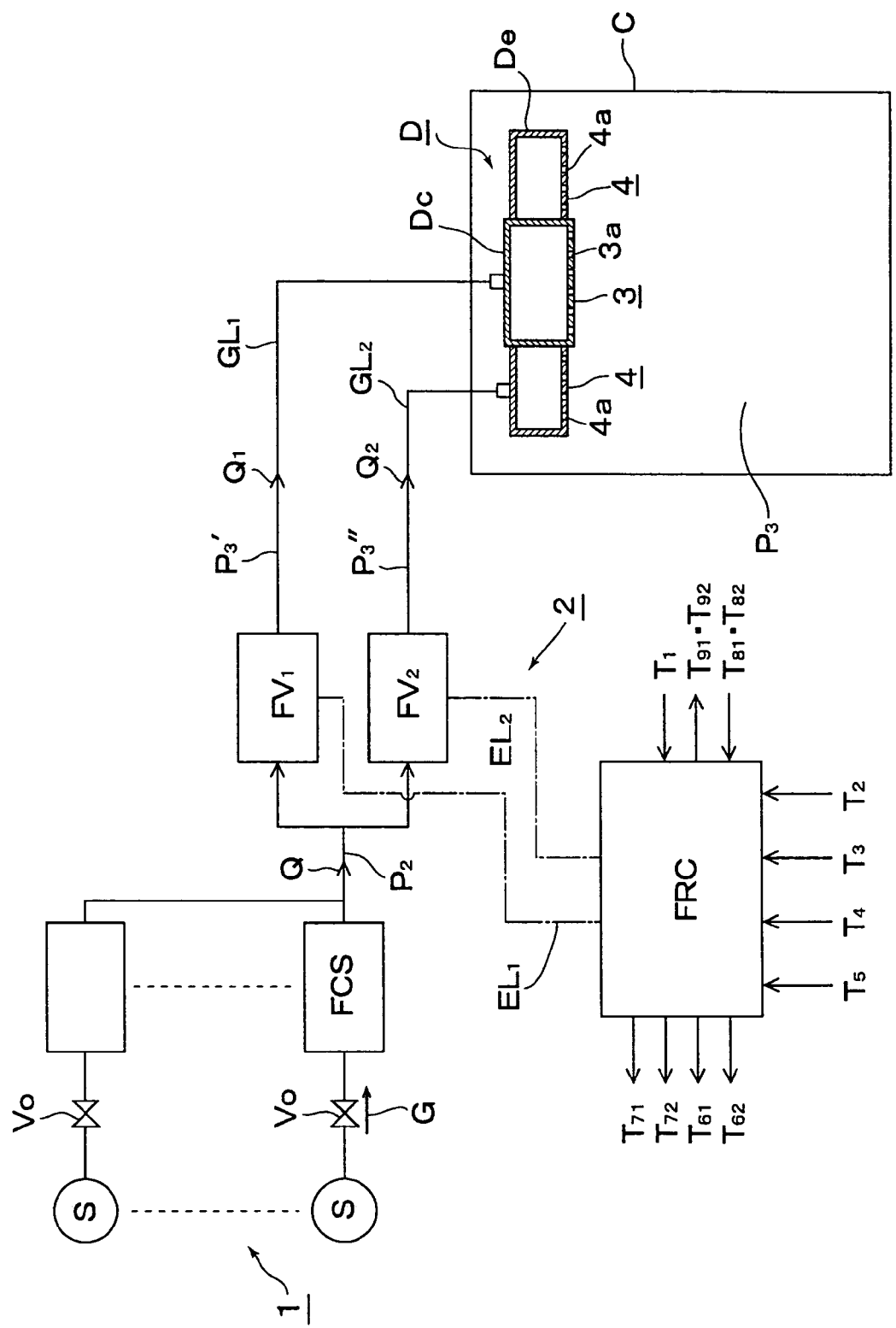
FIG. 1 is a complete diagrammatic view illustrating a method of supplying divided gas to a chamber by means of a gas supply apparatus equipped with a flow-rate control system according to the present invention.

1 Gas supply apparatus
S Treatment gas supply source
Vo Gas main valve
FCS Pressure-type flow-rate control system
G Treatment gas
2 Split flow-rate control system
$FV_1$ Split pressure-type flow-rate controller (split flow-rate controller no. 1)
$FV_2$ Split pressure-type flow-rate controller (divided flow-rate controller no. 2)
FRC Divided flow-rate control board
C Chamber
D Gas discharger
Dc Centre part gas discharger
3 Centre part shower plate
3a Orifice
De Edge part gas discharger
4 Edge part shower plate
4a Orifice
$GL_1$ Centre part split supply line
$GL_2$ Edge part split supply line
Q Total gas flow rate
$Q_1$ Split flow rate
$Q_2$ Split flow rate
$EL_1$, $EL_2$ Signal connection lines
$T_1$ Power source input terminal (DC 15V)
$T_2$ Start•stop signals input terminal
$T_3$ Initial flow rate ratio setting signal input terminal (4 bits input)
$T_4$ Shower plate combination indicator signal input terminal (2 bits)
$T_5$ Automatic zero point adjustment signal input terminal
$T_{61}$, $T_{62}$ Automatic zero point setting error signal output terminals $T_{71}$, $T_{72}$ Control flow rate signal output terminals
$T_{81} \cdot T_{82}$ Flow rate setting signal input terminals
$T_{91} \cdot T_{92}$ Input and output abnormality alarm output terminals
   5 Activation (START) STEP
   6 Start signal confirmation STEP
   7 STEP for confirming the pattern indicator signal and initial flow rate setting signal
   8 STEP for the start of stepwise change of flow rate setting signal
   9 STEP for the evaluation of deviation between input and output signals
   10 STEP for stepwise decrease in flow rate setting signals
   11 STEP for switching the flow rate setting signal back to previous stage
   12 STEP for evaluation of the deviation between input and output signals
   13 STEP for the start of the ramp-change to the flow rate setting signals
   14 STEP for the ramp-change of the flow rate setting signals
   15 STEP for the evaluation of the deviation between input and output signals
   16 STEP for maintaining the flow rate setting signals
   17 STEP for confirming maintenance of the flow rate setting signals

MODE OF CARRYING OUT THE INVENTION

The following embodiment of the present invention is described with reference to the attached drawings hereunder.

FIG. 1 is a complete diagrammatic view illustrating a method of supplying a divided gas to a chamber from a gas supply apparatus equipped with a flow-rate control system according to the present invention.

Referring to FIG. 1, a gas supply apparatus 1 comprises inter alia a supply source S of a treatment gas G, a gas main valve Vo, and a pressure-type flow-rate control system FCS.

A divided flow-rate control system 2 comprises inter alia split pressure-type flow-rate controllers $FV_1$ and $FV_2$, and a divided flow-rate control board FRC. Furthermore, referring to FIG. 1, C designates a chamber, D a gas discharger, Dc a centre part gas discharger, De an edge part gas discharger, $GL_1$ a centre part split supply line, $GL_2$ an edge part split supply line, Q the total gas flow rate, $Q_1$ and $Q_2$ the divided flow rates, $P_2$ the pressure on the downstream side of the orifice of the pressure-type flow-rate control system FCS, $P_3'$ and $P_3''$ the pressures on the outlet side of the split pressure-type flow-rate controllers $FV_1$ and $FV_2$, $P_3$ the pressure inside the chamber C, 3 a shower plate of the centre part gas discharger Dc, 3a an orifice formed on the shower plate, 4 a shower plate of the edge part gas discharger De, and 4a an orifice formed on the shower plate.

In addition, referring to FIG. 1, $EL_1$ and $EL_2$ designate signal connection lines connecting the divided flow-rate control board FRC to the split pressure-type flow-rate controllers $FV_1$ and $FV_2$, Ti a power source input terminal, $T_2$ a start•stop signal input terminal, $T_3$ an initial flow rate ratio setting signal input terminal, $T_4$ an orifice plate combination indicator signal input terminal, $T_5$ an automatic zero point adjustment signal output terminal, $T_{61}$ and $T_{62}$ automatic zero point setting error signal output terminals, $T_{71}$ and T72 control flow rate signal output terminals (output voltages corresponding to $P_3'$ and $P_3''$), $T_{81} \cdot T_{82}$ flow rate setting signal input terminals, and $T_{91} \cdot T_{92}$ input and output abnormality alarm output terminals.

Figure 7:
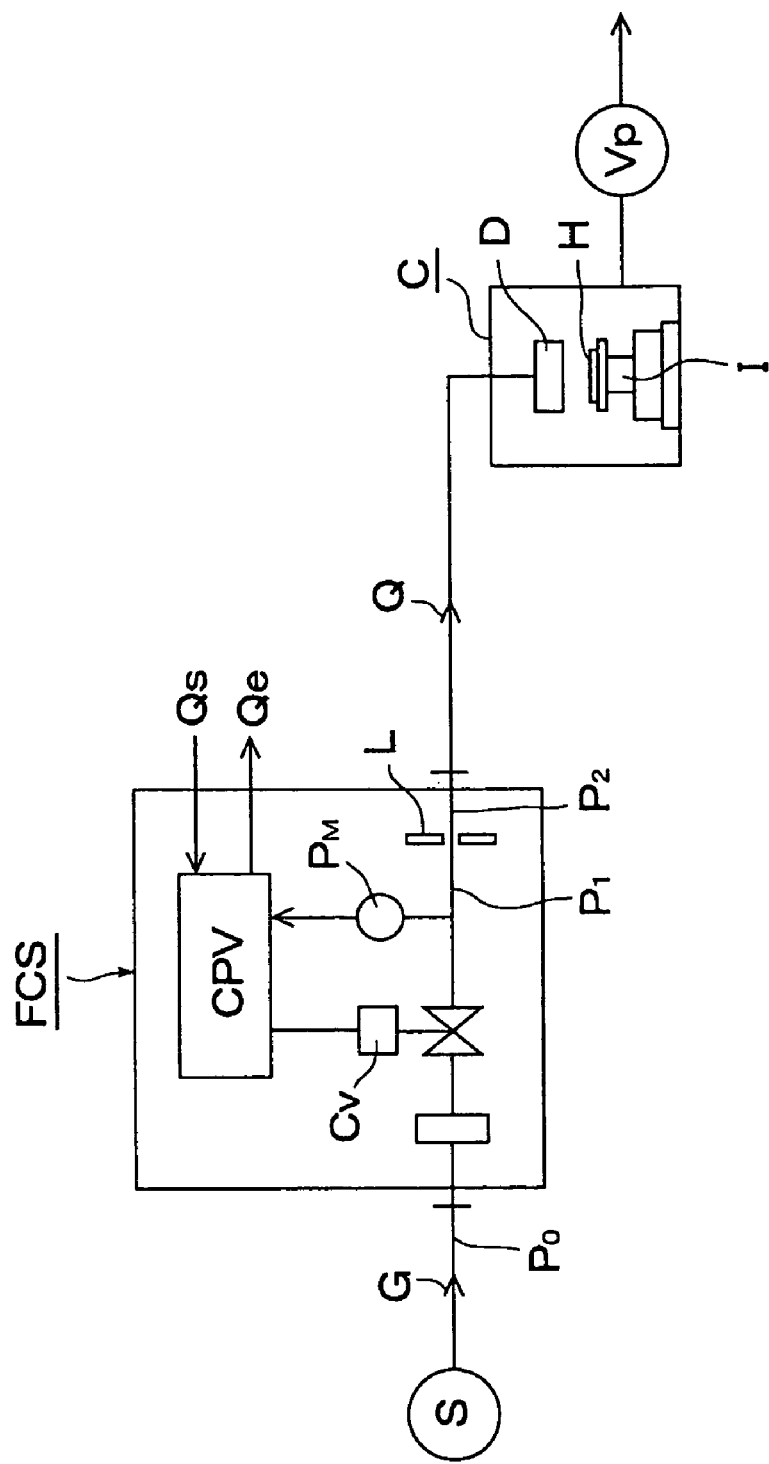
FIG. 7 is an illustration showing a method of supplying a treatment gas to a chamber C using a conventional pressure-type flow-rate control system FCS.
Figure 8:
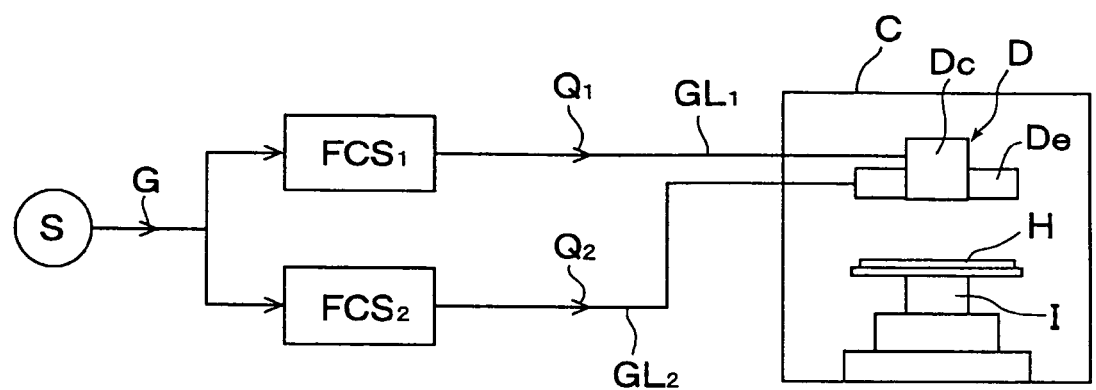
FIG. 8 is an illustration showing the division and supply of a treatment gas from a single gas supply source S to a chamber using a plurality of pressure-type flow-rate control systems.
Figure 9:
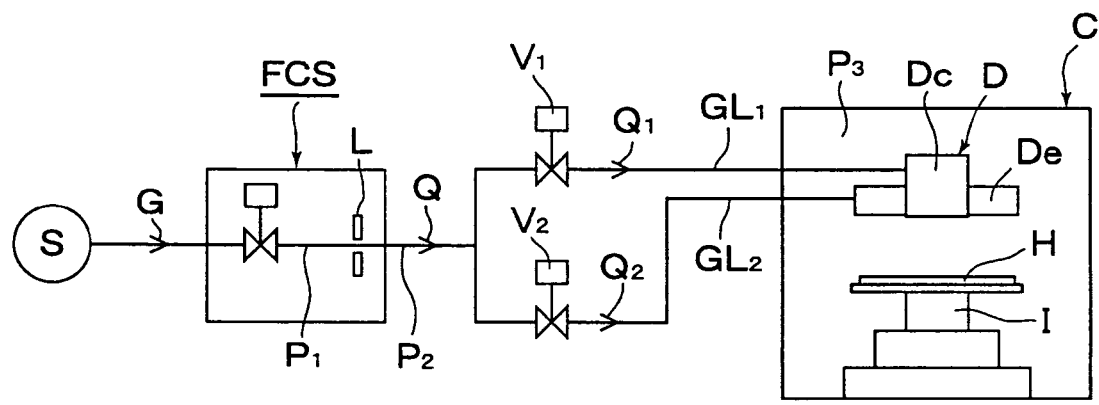
FIG. 9 is an illustration showing the division and supply of a treatment gas to a chamber from a gas supply source equipped with a pressure-type flow-rate control system using control valves.

Said gas supply apparatus 1 comprises inter alia a treatment gas supply source S (supply pressure 250 KpaG or more), and a plurality of pressure-type flow-rate control systems FCS (FIG. 7). The pressure $P_1$ upstream of the orifice L is adjusted using the control valve CV by inputting a prescribed flow rate setting signal Qs to the central processing unit (CPU) of the pressure-type flow-rate control system FCS, and thus the flow rate Q downstream of the orifice is adjusted automatically to the set flow rate Qs.

Further, a control flow rate output signal Qe corresponding to the adjusted flow rate is outputted from the central processing unit (CPU). If the deviation between the flow rate setting input signal Qs and said control flow rate output signal Qe exceeds a set value after a prescribed period of time, then an input and output deviation abnormality signal is dispatched from the CPU (not shown in FIG. 7) as described below.

Said divided flow-rate control system 2 comprises inter alia a plurality of split pressure-type flow-rate controllers $FV_1$ and $FV_2$, a divided flow-rate control board FRC which controls the controllers $FV_1$ and $FV_2$, and orifice plates 3 and 4 connected to respective split pressure-type flow-rate controllers $FV_1$ and $FV_2$.

With regard to the embodiment shown in FIG. 1, two split pressure-type flow-rate controllers are employed. However, more than two split pressure-type flow-rate controllers could of course be employed instead. In such case, the number of the orifice plates would be correspondingly more than two, or the number of the supply outlets would also be more than two.

Said split pressure-type flow-rate controllers $FV_1$ and $FV_2$ are arranged such that the orifice plate L, which is a basic component of a pressure-type flow-rate control system FCS as illustrated in FIG. 7, is removed and replaced by the centre part orifice plate 3 (or the edge part orifice plate 4) having orifices 3a (or 4a).

Figure 2:
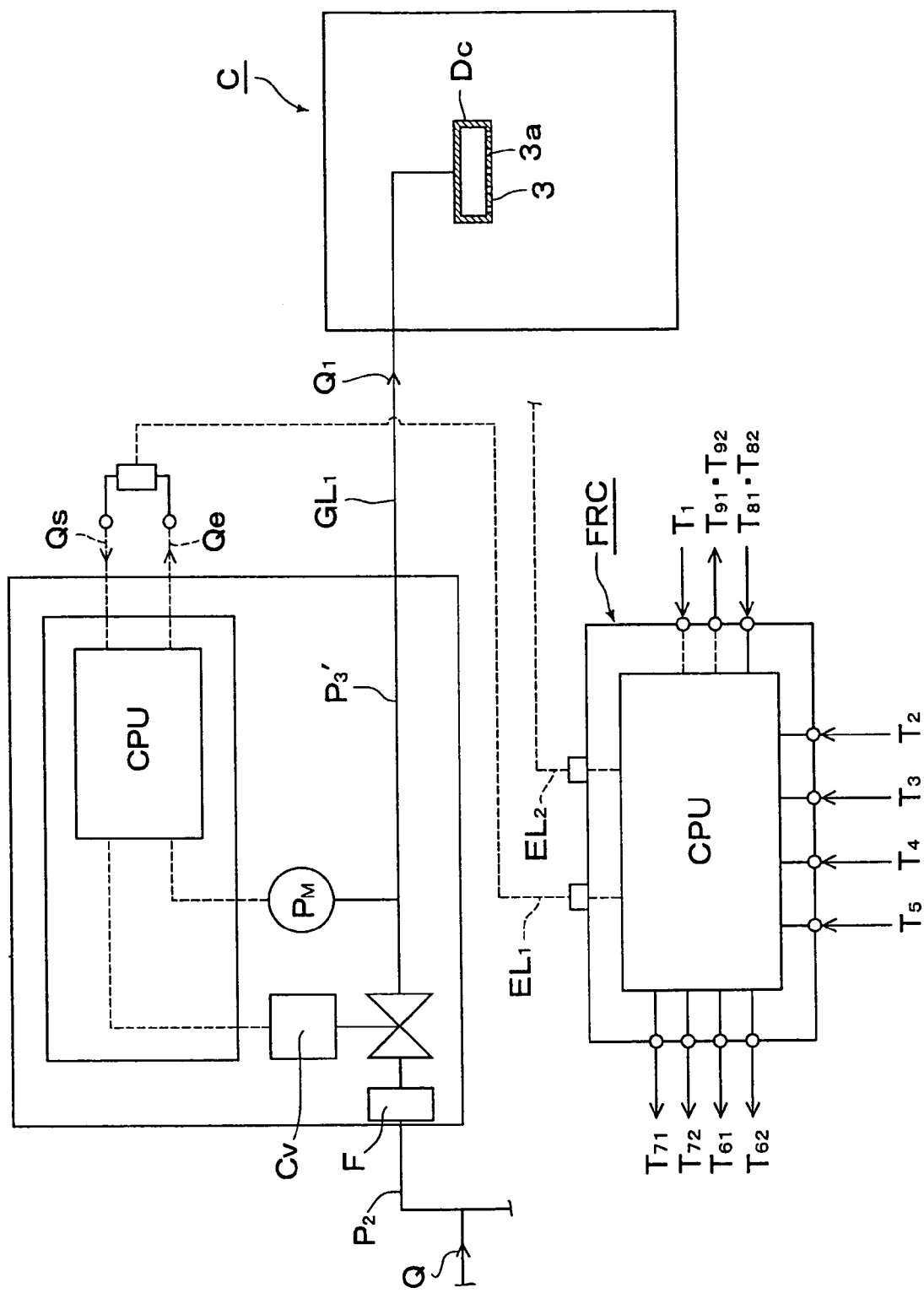
FIG. 2 is a constructional diagram showing a split pressure-type flow-rate controller $FV_1$.

In particular, said split pressure-type flow-rate controllers $FV_1$ and $FV_2$ are constructed as shown in FIG. 2. In the present embodiment, a metal diaphragm valve of the electromagnetic valve actuation type is used so that it can deal easily with high flow rates $Q_1$ and $Q_2$.

The operation of said split pressure-type flow-rate controllers $FV_1$ and $FV_2$ is identical to that of the flow-rate control system FCS.

With reference to FIG. 2, if the relation $P_3' > 2P_3$ is maintained between the pressure $P_3$ inside the chamber C and the pressure $P_3'$ on the upstream side of the orifices 3a of the centre part orifice plate 3, then the divided flow rate $Q_1$ can be controlled on the basis of $Q_1 = CP_3'$ by adjusting the pressure $P_3'$ using the control valve CV, where C is a constant determined inter alia by the cross-sectional area of the orifice 3a, its shape, and the gas temperature.

Referring to FIG. 2, said divided flow-rate control board FRC is provided inter alia with said power source input terminal $T_1$, the input terminal $T_2$ for the start•stop signal [which opens one of the control valves CV of $FV_1$ and $FV_2$ fully (i.e. to its full extent) while opening the other one to a set patency], said initial flow-rate ratio setting signal input terminal $T_3$, the shower plate combination indicator signal input terminal $T_4$ which is explained below, said automatic zero point adjustment signal input terminal $T_5$, said automatic zero point adjustment error signal output terminals $T_{61}$ and $T_{62}$, said control flow rate signal output terminals $T_{71}$ and $T_{72}$, said set flow rate signals $Q_1$ and $Q_2$ input terminals $T_{81} \cdot T_{82}$, and said input and output abnormality alarm output terminals $T_{91} \cdot T_{92}$, and is connected to the pressure-type flow-rate controllers $FV_1$ and $FV_2$ through said signal connection lines $EL_1$, $EL_2$.

Thus, when an actuation signal is inputted to said input terminal $T_2$, the respective split pressure-type flow-rate controllers $FV_1$ and $FV_2$ start operating at a predetermined initial set flow rate ratio. (In particular, as described below, the control valve CV of the split flow-rate controller for the greater flow rate of the two flow rates $Q_1$ and $Q_2$ is opened to its full extent, whilst the degree to which the control valve CV of the other flow-rate controller is opened is adjusted to a value obtained from "the full opening degree× a coefficient (<1) as calculated in advance".

When a stop signal is inputted to the input terminal $T_2$, the control valves CV of both the split pressure-type flow-rate controllers $FV_1$ and $FV_2$ are shut fully.

Furthermore, a zero point adjustment signal is normally inputted to the automatic zero point adjustment signal input terminal $T_5$ for automatic zero point adjustment of the split pressure-type flow-rate controllers $FV_1$ and $FV_2$ before the actuation signal is inputted to said input terminal $T_2$.

If automatic zero point adjustment is not performed as required, then an alarm is outputted to the automatic zero point adjustment error signal output terminals $T_{61}$, $T_{62}$.

An initial flow rate ratio setting signal calculated on the basis of the supply flow rate ratio $Q_1/Q_2$ between the flow rates $Q_1$ and $Q_2$ for the split supply lines $GL_1$ and $GL_2$ respectively, using the numerical values listed in Table 1 given below, is inputted to said initial flow rate ratio setting signal input terminal $T_3$.

Referring to the embodiment of the present invention, said flow rate ratio $Q_1/Q_2$ can be set to one of 1/1, 1/2, 1/3, 1/4, 2/1, 3/1, and 4/1. The initial flow rate ratio setting signal calculated based on this set flow rate ratio is inputted to the input terminal $T_3$ in the form of a 4-bit digital signal. The flow rate ratio $Q_1/Q_2$ and the initial flow rate setting ratio signal are of course not of the same values.

Further, each numerical value listed in Table 1, as explained below, designates the ratio $P_3''/P_3'$ between the control pressures $P_3'$ and $P_3''$ upstream of the orifices $3a$ and $4a$, where the control pressures $P_3'$ and $P_3''$ upstream of the orifices $3a$, $4a$ required to discharge said gas G at said prescribed flow rates $Q_1$ and $Q_2$ are calculated on the basis of the calibres and numbers of the orifices $3a$ and $4a$ in the shower plates 3, 4 connected to the ends of the split gas supply lines.

A signal to indicate the combination of the shower plates (orifice plates) 3, 4 of the gas dischargers Dc, De is inputted to said terminal $T_4$. In particular, in the present embodiment, two kinds of centre part shower plate 3 are provided, one equipped with 420 orifices $3a$, and the other with 480 orifices $3a$. Similarly, two kinds of edge part shower plate 4 are provided, one equipped with 360 orifices $4a$, and the other with 476 orifices $4a$.

Two different combinations of said shower plates 3, 4 are predetermined; namely, one combination of the shower plate 3 having 420 orifices $3a$ and the shower plate 4 having 360 orifices $4a$ (hereinafter called PATTERN 1); and the other combination of the shower plate 3 having 480 orifices $3a$ and the shower plate 4 having 476 orifices $4a$ (hereinafter called PATTERN 2). 2-bit digital signals indicating said PATTERN 1 or PATTERN 2 are inputted to said terminal 4.

Said control flow rate output signal output terminals $T_{71}$ and $T_{72}$ are output terminals for indicating the control flow rates (actual flow rates) $Q_1$ and $Q_2$ of the split pressure-type flow-rate controllers $FV_1$ and $FV_2$ in operation, and the control flow rates (actual flow rates) $Q_1$ and $Q_2$ are outputted in the form of a voltage output (0~5V).

Said flow rate setting signal input terminals $T_{81} \cdot T_{82}$ are input terminals for voltage signals of 0~5V corresponding to the flow rates $Q_1$ and $Q_2$ supplied to the split supply lines $GL_1$ and $GL_2$.

Since the total flow-rate Q is set by the upstream side pressure-type flow-rate control system FCS, and the initial flow rate ratio setting signal calculated on the basis of the flow rate ratio $Q_1/Q_2$ is inputted to the terminal $T_3$, the level of the flow rate setting signals of the divided flow rates $Q_1$ and $Q_2$ can be automatically calculated inside the CPU. Consequently, it is unnecessary in practice to input flow rate setting signals for the flow rates $Q_1$ and $Q_2$ to said input terminals $T_{81} \cdot T_{82}$ in advance. However, it is desirable that the flow-rates $Q_1$ and $Q_2$ could be set independently at the split pressure-type flow-rate controllers $FV_1$ and $FV_2$ in order to deal with a situation where the total flow-rate Q cannot be set with great precision by the upstream pressure-type flow-rate control system FCS, or where the gas is supplied directly from the treatment gas supply source S to the split pressure-type flow-rate controllers $FV_1$ and $FV_2$. For this reason it would be desirable that said input terminals $T_{81} \cdot T_{82}$ are installed.

Said input and output abnormality alarm output terminals $T_{91} \cdot T_{92}$ compare the flow rate setting signals for the flow rates $Q_1$ and $Q_2$ with the control flow rate signals (actual flow rates $Q_1$ and $Q_2$) and sends an abnormality signal if the deviation between the flow rate setting signal and the actual control flow rate signal is found to be greater than a prescribed value even after the lapse of a predetermined period of time.

The present embodiment is arranged such that the input and output signals at the prescribed levels are inputted and outputted directly to the terminals of the divided flow-rate control board FRC. However, input and output signals by serial communication could of course be used for the input and output signals for the terminals.

Figure 3:
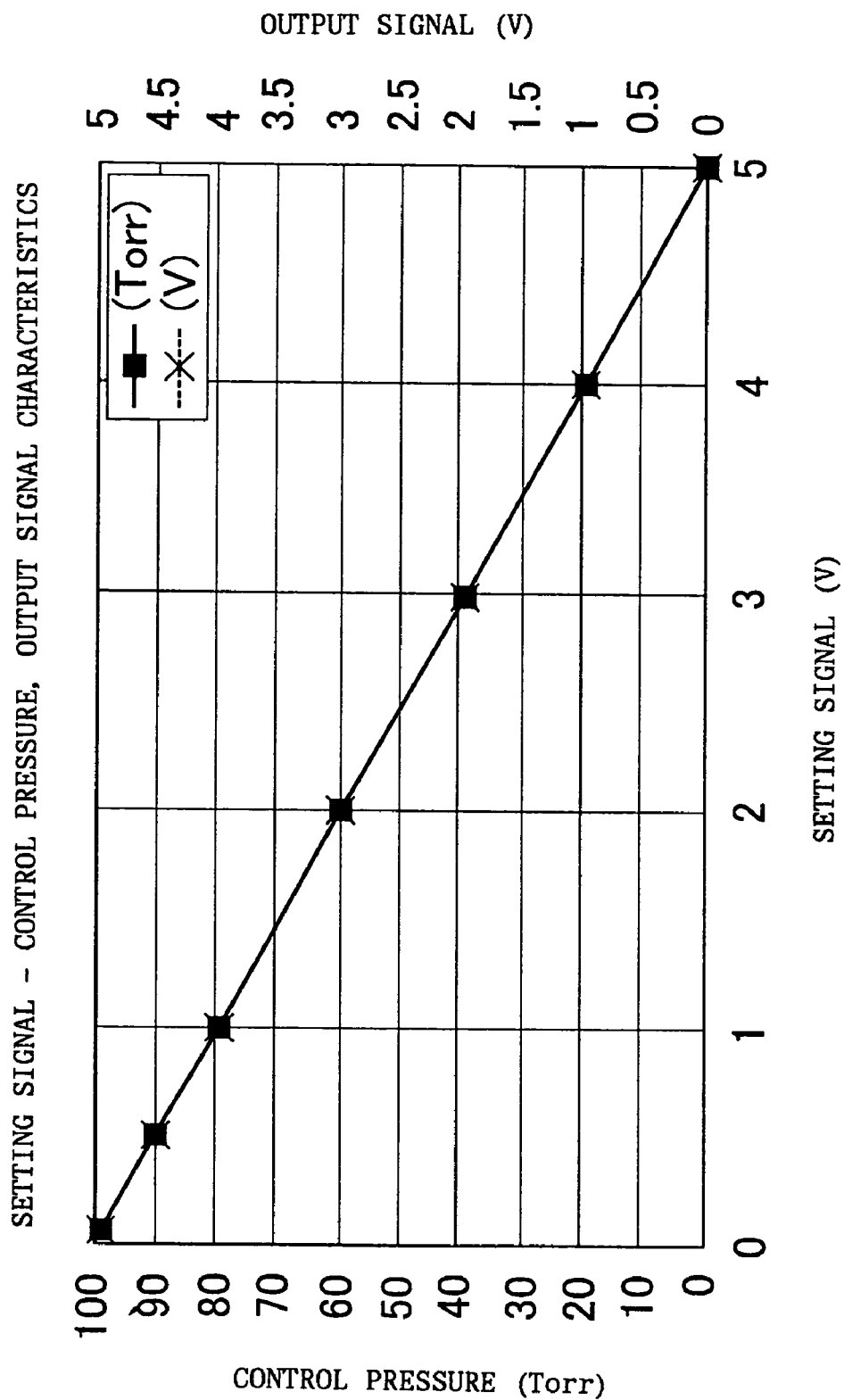
FIG. 3 is a characteristic curve showing the relationship between a flow-rate setting signal, and a flow rate control pressure and a flow-rate output signal for the split pressure-type flow-rate controller $FV_1$.

Divided flow-rate control using said pressure-type divided flow-rate controllers $FV_1$ and $FV_2$ is conducted by controlling the pressure $P_3'$ and $P_3''$ on the downstream side using the control valves CV as mentioned above. In the present embodiment, divided pressure-type flow rate controllers $FV_1$ and $FV_2$ are used which have the characteristics shown in FIG. 3 as between the setting signals (0~5V) for the flow rates $Q_1$ and $Q_2$, the control pressure $P_3$ (Torr), and the output signals (0~5V) for the actual flow rate (the control flow rate).

Figure 4:
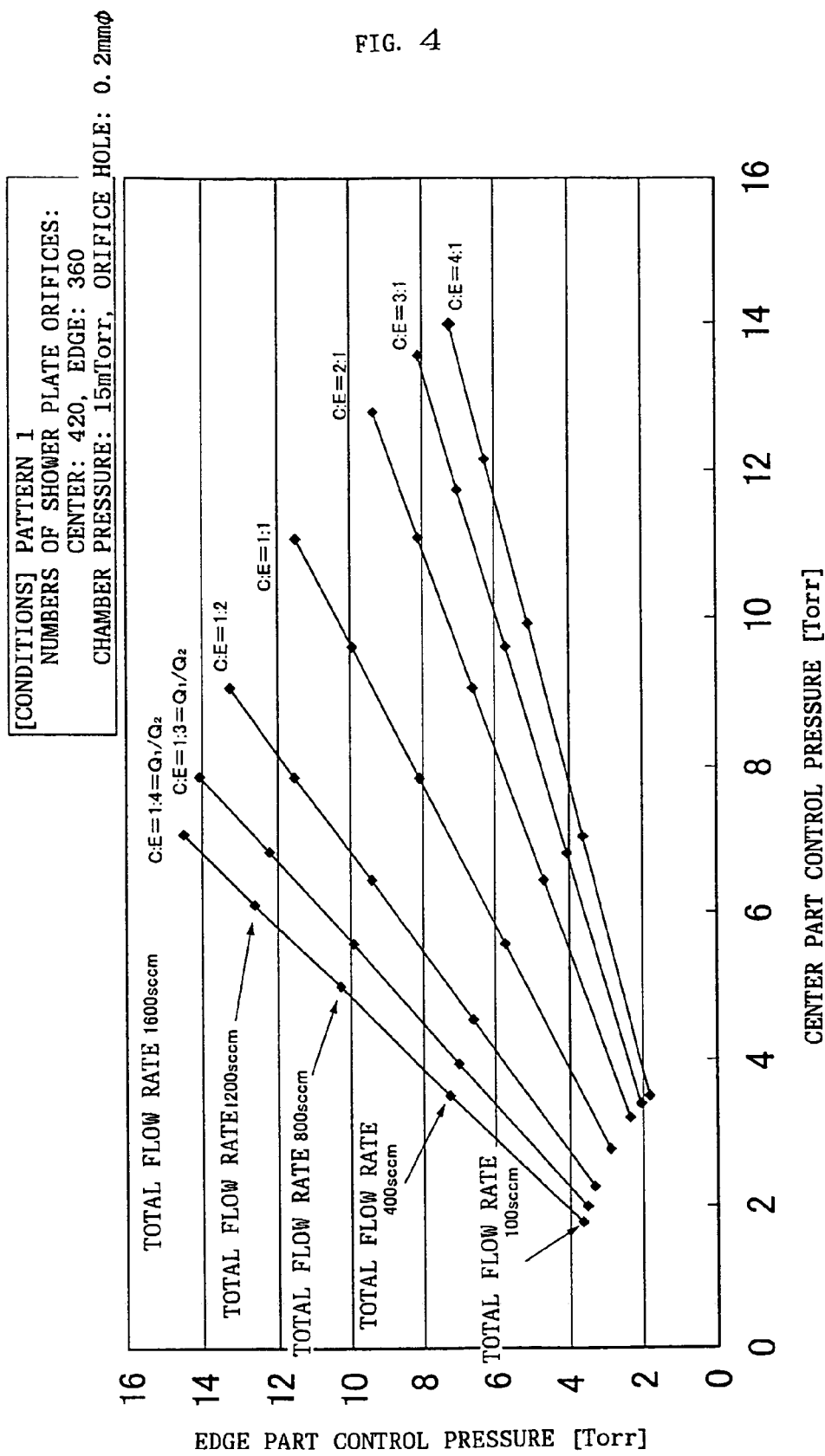
FIG. 4 is a diagrammatic view (a calculated value) for the divided flow supply of FIG. 1 showing the relationship between the flow rate control pressures ($P_3'$ and $P_3''$) for the split pressure-type flow-rate controllers, the total flow-rate Q, and the divided flow ratio $Q_1/Q_2$ where the combination of shower plates 3 and 4 is as per PATTERN 1.

FIG. 4 is a graphical presentation of numerical values calculated using the flow rate ratio (C/E=$Q_1/Q_2$) as a parameter, representing the relationship between the total flow-rate Q, the control pressure $P_3'$ for the centre part split pressure-type flow-rate controller $FV_1$, and the control pressure $P_3''$ for the edge part split pressure-type flow-rate controller $FV_2$, for the combination of the shower plate 3 having 420 orifices and an inside diameter of 0.2 mm φ for the centre part gas discharger Dc and the shower plate 4 having 360 orifices and an inside diameter of 0.2 mm φ for the edge part gas discharger De (PATTERN 1). By way of example, where $Q_1/Q_2=1$ and Q=1600, 1200, 800, 400 and 100 SCCM, the mean value of the ratio $P_3''/P_3'$ between the centre part control pressure $P_3'$ and the edge part control pressure $P_3''$ is 0.961.

Figure 5:
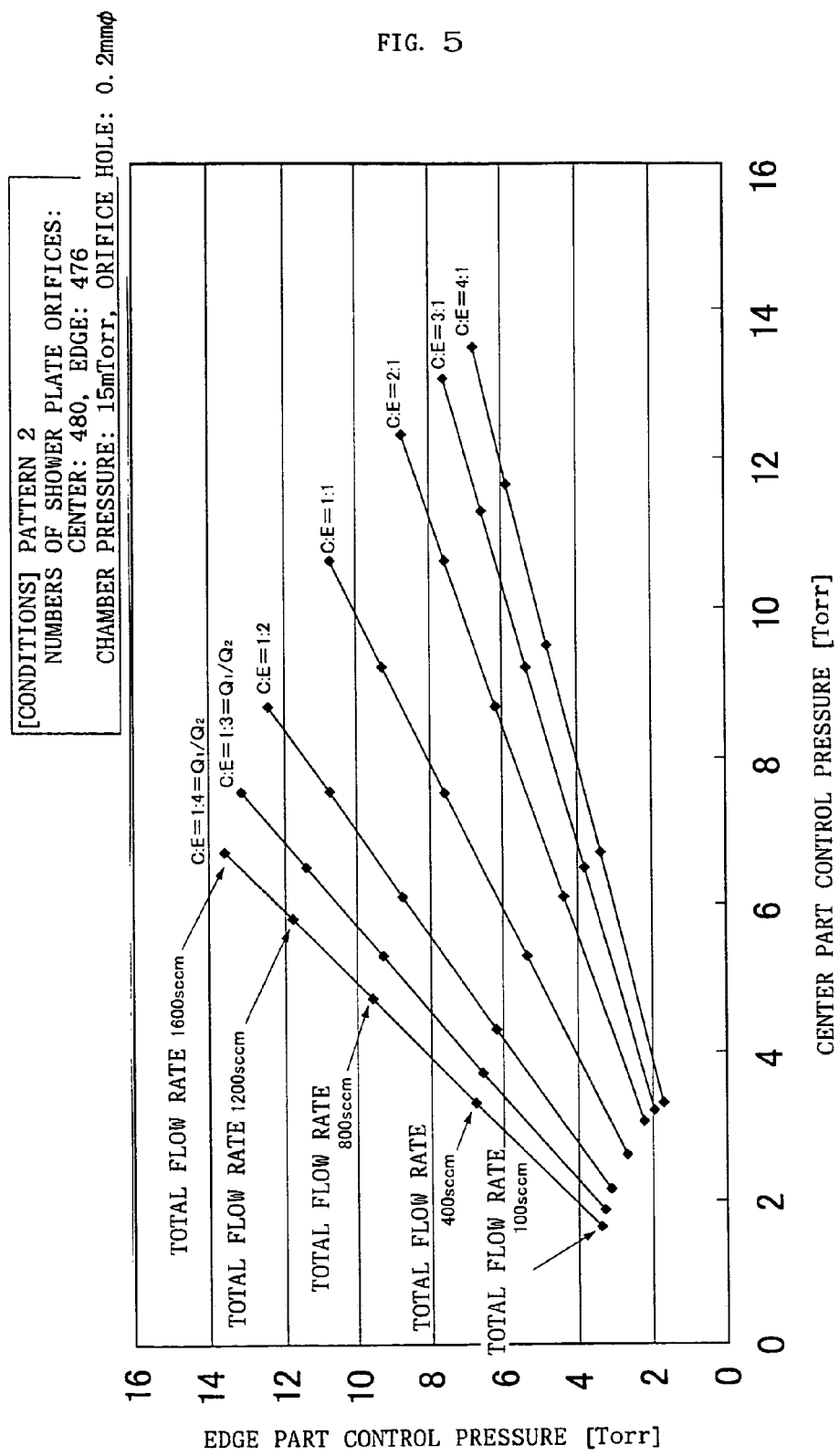
FIG. 5 is a diagrammatic view (a calculated value) showing the same relationship as FIG. 4, where the combination of shower plates 3 and 4 is as per PATTERN 2.

Similarly, FIG. 5 is a graphical presentation of numerical values calculated in the same manner as those of FIG. 4 for the combination of the shower plate 3 having 480 orifices $3a$ and an inside diameter of 0.2 mm φ for the centre part gas discharger Dc and the shower plate 4 having 476 orifices 4a and an inside diameter of 0.2 mm φ for the edge part (PATTERN 2). By way of example, where $Q_1/Q_2=1$ and Q=1600, 1200, 800, and 100 SCCM, the mean value of the ratio $P_3''/P_3'$ between the centre part control pressure $P_3'$ and the edge part control pressure $P_3''$ is 0.999.

Table 1 is a list of calculated values showing the relationship between the flow rate ratio $Q_1/Q_2$ and the ratio $P_3''/P_3'$ (i.e. edge part control pressure/centre part control pressure) for PATTERN 1 and PATERN 2 as shown in FIGS. 4 and 5. Table 1 shows that if, for example, PATTERN 1 is employed for the combination of the shower plates 3 and 4 in use and the flow rate ratio $Q_1/Q_2$ is set to 1, then the ratio $P_3''/P_3'$ between the control pressure $P_3'$ for the centre part split pressure-type flow-rate controller $FV_1$ and the control pressure $P_3''$ for the edge part split pressure-type flow-rate controller $FV_2$ is computationally 0.961.

Said relationship between Q, $Q_1/Q_2$ and $P_3''/P_3'$ is calculated using the following computation formulae for conductance:

The gas flow rate Q in a pipe is expressed as $$Q = C \times (P_1 - P_2) \quad \text{①}$$

$$\text{whilst } C = 182 \times D^4 \times (P_1 + P_2)/2 \times 1/L \quad \text{②},$$

wherein C designates conductance (L/sec), D the diameter of the pipe (cm), L the length of the pipe length (cm), $P_1$ the pressure (Torr) at the upstream end of the pipe, $P_2$ the pressure (Torr) at the downstream end of the pipe, and Q the flow rate (Torr.L/sec).

The pressure ($P_3'$ and $P_3''$) inside the pipe on the upstream side of the shower plates is calculated using ① and ② above, with the inside diameter of the orifice hole of the shower plate as D, the length of the orifice hole of the shower plate as L, the internal pressure ($P_3$=0.015 Torr) of the chamber as the downstream side pressure $P_2$, and the flow rate in each orifice hole as the flow rate Q.

TABLE 1

| Flow rate ratio $Q_1/Q_2$ | PATTERN 1 Control pressure ratio $P_3''/P_3'$ | PATTERN 2 Control pressure ratio $P_3''/P_3'$ | Initial flow rate ratio setting |
|---|---|---|---|
| 1/1 | 0.961 | 0.999 | Full opening (initial setting input signal = 5 V) of FCSV$_2$ for flow rate Q$_2$ |
| 1/2 | 0.679 | 0.705 | |
| 1/3 | 0.557 | 0.578 | |
| 1/4 | 0.481 | 0.498 | |
| 2/1 | 0.736 | 0.707 | Full opening (initial setting input signal = 0 V) of FCSV$_1$ for flow rate Q$_1$ |
| 3/1 | 0.601 | 0.579 | |
| 4/1 | 0.520 | 0.500 | |

The method of supplying a divided gas to a chamber according to the present invention is explained below.

With reference to FIGS. 1 and 2, if the actuation signal is not inputted to input terminal $T_2$ of the divided flow-rate control board FRC, then the control valves CV of both of the pressure-type flow-rate controllers $FV_1$ and $FV_2$ are opened to their full extent. As a result, the treatment gas supplied from the gas supply source S and adjusted to the flow rate Q by means of the pressure-type flow-rate control system FCS is supplied through the split flow-rate controllers $FV_1$ and $FV_2$ at a ratio corresponding approximately to the ratio between the respective total areas of the nozzle holes 3a and 3b of the shower plates 3 and 4.

Now, for divided supply of the gas G having said total flow-rate Q at a prescribed ratio $Q_1/Q_2$ (for example Q1/Q2=2/1), an indicator signal (PATTERN 1) corresponding to the combination pattern of the shower plates 3 and 4 of the gas dischargers Dc and De that are connected to the ends of the split supply lines $GL_1$ and $GL_2$ is first inputted to input terminal $T_4$, and then an initial flow rate ratio setting signal is obtained from the desired flow rate ratio $Q_1/Q_2$ on the basis of Table 1, and the obtained signal is inputted to input terminal $T_3$.

In particular, where the combination pattern of the shower plates 3 and 4 is PATTERN 1, and the divided flow rate ratio $Q_1/Q_2$ is 2/1, the flow rate setting signal to the centre part split pressure-type flow-rate controller $FV_1$ is 5−1.000×5=0V, using Table 1. The initial flow rate setting signal to the edge part split pressure-type flow-rate controller $FV_2$ on the edge side is 5−0.736×5=1.32V, from Table 1. In this example, therefore, an initial flow rate setting signal of 0/1.32 is inputted to input terminal $T_3$.

In accordance with the embodiment, the initial flow-rate ratio setting to be inputted to both of the split pressure-type flow-rate controllers is calculated in advance using Table 1, and then what is obtained is inputted to the input terminal $T_3$. However, as an alternative, the following is also possible. That is, said flow rate setting signal input terminals $T_{81} \cdot T_{82}$ could be provided, and the divided flow rates $Q_1$ and $Q_2$ could be inputted to the respective terminals. The data from Table 1 could be pre-stored in the internal CPU, and said initial flow-rate setting ratio 0/1.32 could be calculated within the CPU.

Of course, prior to the start of the divided flow supply, automatic zero point adjustment should be carried out on the split pressure-type flow-rate controllers $FV_1$ and $FV_2$ by applying an automatic zero point adjustment signal to input terminal $T_5$.

Figure 6:
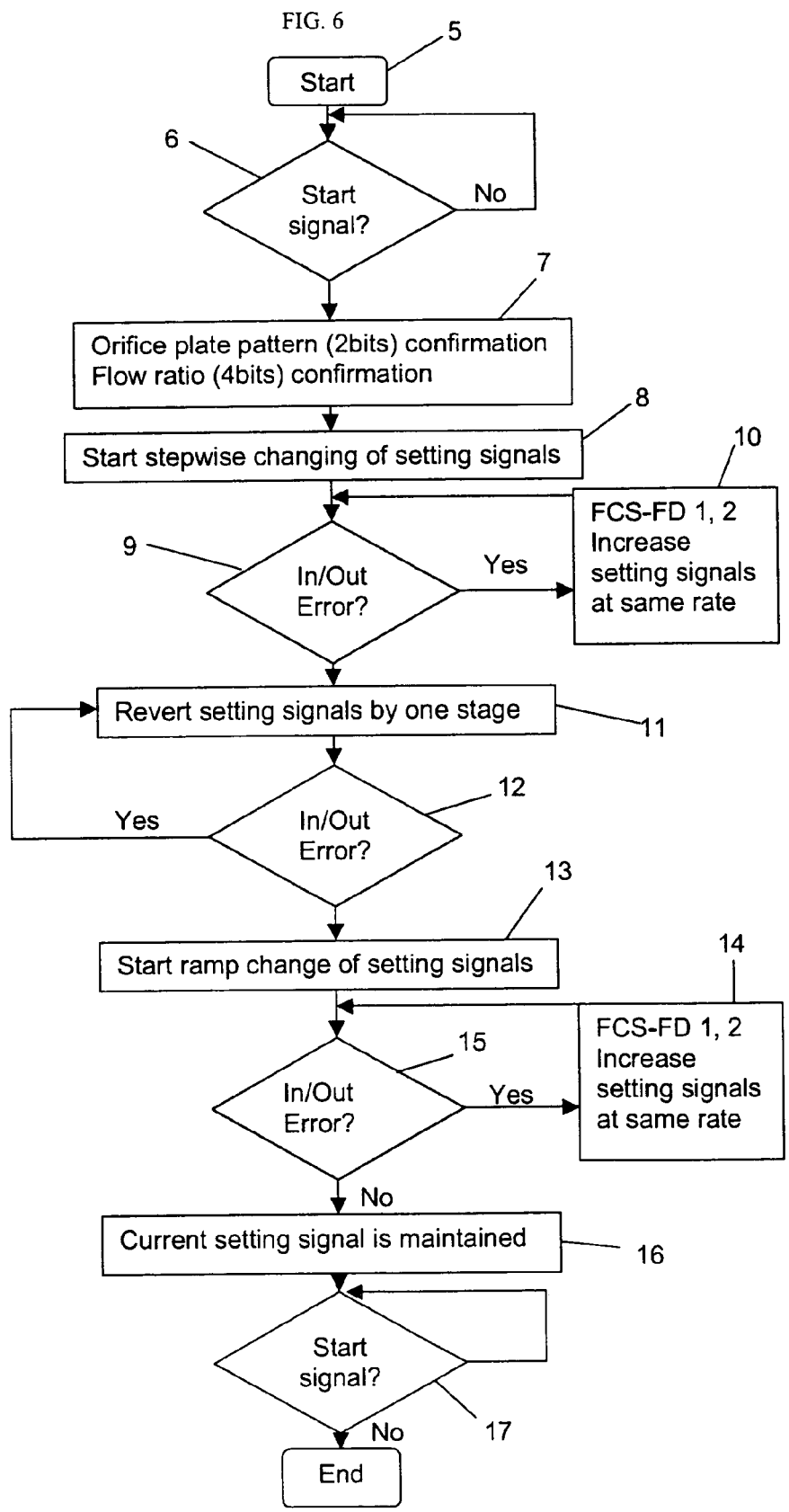
FIG. 6 is a flow chart of divided gas flow control using a pressure-type flow-rate control system to illustrate a method of supplying divided gas to a chamber.

With reference to FIG. 6, for the starting operation (STEP 5) the actuation (start) signal is applied to terminal $T_2$, and then the presence of said start signal is verified (STEP 6). Once the input of the start signal has been acknowledged, the presence of a shower plate combination indicator signal (the pattern signal) which has been inputted to terminal $T_4$, and the presence of an initial flow rate ratio setting signal which has been inputted to terminal $T_3$ are verified (STEP 7).

When the input of the initial rate ratio setting signal has been acknowledged, the stepwise changing of said initial flow rate setting ratio signal commences (STEP 8).

Specifically, when the initial flow rate ratio setting signal is inputted to terminal $T_3$ (in this embodiment, the value of the initial flow rate setting ratio is 0.736, where the initial flow rate setting value for $FV_1$ is 0V and the initial flow rate setting value for $FV_2$ is 1.325V), the initial flow rate setting values are inputted to both of the split pressure-type flow-rate controllers $FV_1$ and $FV_2$ such that said controllers $FV_1$ and $FV_2$ pass the gas at flow rates corresponding to the initial flow rate setting values, while control flow rate output signals, corresponding to the current flow rates, are outputted to the terminals $T_{71}$ and $T_{72}$.

Said control flow rate output signals for said split pressure-type flow-rate controllers are compared with the flow rate setting input signals at STEP 9 to check if there is any deviation between the input and output signals.

If it is found that the deviation between the input and output signals exceeds a set value for a prescribed duration, then the flow rate setting signals to the split out flow-rate controllers $FV_1$ and $FV_2$ are increased stepwise at the same rate (or degree) (STEP 10).

Specifically, the input value of the flow rate setting signal to the split flow-rate controller $FV_1$ for the greater flow rate $Q_1$ is increased stepwise by 100%→50%→30%→20%→10%→5%/0.5 sec., and contemporaneously the input value of the flow rate setting signal to the split flow-rate controller $FV_2$ for the lesser flow rate $Q_2$ side is adjusted so as to maintain the same flow rate ratio.

In particular, in accordance with this embodiment, the initial flow rate ratio setting value is 0.736 (3.68/5) [said initial flow rate setting value for $FV_1$ is 0 (5−5=0) V, and the initial flow rate setting value for $FV_2$ is 1.32 (5−3.68=1.32) V], and said initial flow rate setting value of 0 (5−5=0) V and initial flow rate setting value of 1.32 (5−3.68=1.32) V are respectively increased stepwise at the same rate by 50%→30%→20%→10%→5%/0.5 sec. With the 50% change in the first stage (stage 1), the initial flow rate ratio setting is increased to 2.5 (5−5×0.5=2.5)/3.16 (5−2.5×0.736=3.16).

And with the elapse of every 0.5 seconds thereafter, said stepwise changes are repeated in the series:

3.5 (5−5×0.3)/3.896 (5−1.5×0.736) (stage 2);
4.0 (5−5×0.2)/4.264 (5−1×0.736) (stage 3);
4.5 (5−5×0.1)/4.632 (5−0.5×0.736) (stage 4); and
4.75 (5−5×0.05)/4.816 (5−0.25×0.736) (stage 5).

When the deviation between the input and output signals at STEP 9 falls within a set range as a result of the stepwise changes of said flow rate setting signal inputs, the input values of the flow rate setting signals for the split flow-rate controllers $FV_1$ and $FV_2$ are caused to return to the input signal values for the immediately preceding stage (STEP 11), and then the presence of the deviation between the input and output signals is rechecked (STEP 12).

If the deviation between the input and output signals at STEP 9 exceeds a value corresponding to 3% of the full scale (that is, 5V) for more than about 0.5 seconds, then it is determined that there is an abnormality in the deviation and the stepwise change moves on to the next stage.

When the existence of a deviation between the input and output signals is recognized at STEP 12, ramp control commences (STEP 13) to cause the flow rate setting signal inputs for the split flow-rate controllers $FV_1$ and $FV_2$ undergo a ramp change at the same rate or degree following on from the present flow rate setting signals.

By way of specific explanation, the ramp change in said flow rate setting signals is carried out in such a manner that the flow rate setting signal input to the split flow-rate controller $FV_1$ having the greater flow rate $Q_1$ is subjected to a ramp change of 10%/0.5 seconds, whilst the flow rate setting signal input for the split flow-rate controller $FV_2$ having the lesser flow rate $Q_2$ is increased contemporaneously at the same rate (STEP 14). The deviation between the flow rate setting signal input after application of the ramp change and the current control flow rate signal output observed at that time is then checked at STEP 15.

For example, in the embodiment described above, assuming that no deviation is found between the input and output at stage 4 of STEP 10 (i.e. a flow rate setting ratio of 4.5/4.632), the flow rate setting signals for the split flow-rate controllers $FV_1$ and $FV_2$ are reverted to their state at stage 3 of STEP 10 (i.e. a flow rate setting ratio of 4.0/4.264). Then, once the flow rate setting input to the split pressure-type flow-rate controller $FV_1$ has been set to 4.0V and the flow rate setting input to the split pressure-type controller $FV_2$ has been set to 4.264V (STEP 11), the existence or non-existence of a deviation between the input and output signals is confirmed once again at STEP 12. The ramp change of the flow-rate setting signals then commences at STEP 13. The flow rate setting signal input of 4.0V to said split pressure-type flow-rate controller $FV_1$ is subjected to said ramp change at a rate of 0.5V/0.5 second, while the flow rate setting signal input of 4.264V to the split pressure-type flow-rate controller $FV_2$ is increased at the rate of 0.5V× 0.736=0.368V/0.5 second.

Subsequently, the deviation between said flow rate setting signal input which has been subjected to the ramp change and the control flow rate signal output is checked at STEP 15. When a deviation is not seen (that is to say, when it falls below the prescribed value) continuously for a given time, e.g. for 0.1 seconds, the flow rate setting signal inputs to the split flow-rate controllers $FV_1$ and $FV_2$ are fixed and maintained at the flow rate setting signal values of STEP 14 respectively (STEP 16).

Lastly, in STEP 17, the existence or non-existence of the input of said fixed and maintained flow rate setting signal is verified, and thus automatic control of the divided flow rate by the split flow-rate controllers $FV_1$ and $FV_2$ for the divided supply of the material gas (flow rate Q) from the gas supply source S is accomplished.

That is, the material gas G having the prescribed flow rate Q from the gas supply source S is divided in the prescribed flow rate ratio $Q_1/Q_2$ such that it is supplied to the wafer H placed inside the chamber C via the gas dischargers Dc and De.

Effects of the Invention

In accordance with the present invention, a treatment gas G having a flow rate Q is divided and supplied to a pressure chamber C from a gas supply apparatus equipped with a pressure-type flow-rate control system FCS through split pressure-type flow-rate controllers $FV_1$ and $FV_2$, wherein flow rate control of the split pressure-type flow-rate controllers $FV_1$ and $FV_2$ is initiated by means of an initial flow rate control setting signal from a divided flow-rate control board FRC which causes the control valve CV of the pressure-type flow-rate controller for the greater divided flow rate to open fully, and wherein the treatment gas G is divided and supplied to the controllers $FV_1$,$FV_2$ at divided flow rates $Q_1$ and $Q_2$ expressed as flow rates $Q_1=C_1P_3'$ and $Q_2=C_2P_3''$ (where $C_1$ and $C_2$ are constants) by adjusting the pressures $P_3'$ and $P_3''$ on the downstream side of said respective control valves CV, using the orifices 3a and 4a of the shower plates 3 and 4 provided in the chamber C.

Consequently, according to the present invention, even with treatment gas from a gas supply apparatus equipped with a pressure-type flow-rate control system FCS, the pressure $P_2$ on the downstream side of the orifice of the pressure-type flow-rate control system FCS is not permitted to rise sharply at the time of splitting the flow, with the result that the total flow rate Q can be controlled to the desired flow rate value with precision regardless of the divided control by means of the pressure-type flow-rate controllers $FV_1$ and $FV_2$.

According to the present invention, operation of the present invention can be performed in an extremely easy and inexpensive manner because the orifices 3a and 4a of the shower plates 3 and 4 provided inside the chamber C are effectively utilized as component parts of the split pressure-type flow-rate controllers $FV_1$ and $FV_2$, and, further, both of the split pressure-type flow-rate controllers $FV_1$ and $FV_2$ are practically identical to the pressure-type flow-rate control system FCS.

Furthermore, according to the present invention, the initial flow rate setting signal causes the control valve of the split pressure-type flow-rate controller having the greater flow rate to be fully opened (opened to its full extent) and the control valve of the other split pressure-type flow-rate controller to be opened to a degree equal to the full opening×α (where α is a computed opening ratio $P_3''/P_3'$ calculated in advance in accordance with the final flow rate ratio $Q_2/Q_1$) for commencing divided flow rate control, wherein rough adjustment of the divided flow rate ratio $Q_1/Q_2$ is performed first by stepwise changes of said flow rate setting signals, and then, when it is found that the deviation between the input and output signals is within a prescribed range, the flow rate setting signals are subjected to a ramp-change once the flow rate setting signals have been returned to the ones one step previously. The flow rate setting input signal and the control flow rate output signal are then compared with one another. When it is found that the deviation between the input and output signals has been brought below a set value for a prescribed time, then the flow rate signals are fixed and maintained as final flow rate setting signals to the split pressure-type controllers $FV_1$ and $FV_2$.

As a result, the method according to the present invention makes it possible to conduct divided flow rate control by means of pressure-type flow-rate controllers $FV_1$ and $FV_2$ with extreme promptness and precision with respect to many flow rate ratios $Q_1/Q_2$.

As explained above, the present invention achieves excellent, practical effects.

The invention claimed is:

1. A method of supplying divided gas to a chamber from a gas supply apparatus equipped with a flow rate control system, characterised in that a gas G with a set flow rate Q is supplied into a chamber C at a prescribed flow rate ratio $Q_1/Q_2$ from a gas supply apparatus 1 equipped with a flow rate supply system through a plurality of split supply lines $GL_1$ and $GL_2$ and shower plates 3 and 4 attached to the ends thereof, wherein, with split pressure-type flow-rate controllers $FV_1$ and $FV_2$ installed in said plurality of split supply lines $GL_1$ and $GL_2$, control of the degrees of opening of said split flow-rate controllers $FV_1$ and $FV_2$ is commenced by means of an initial flow rate setting control signal from a divided flow-rate control board FRC causing the control valve CV of the split pressure-type flow-rate controller having the greater flow rate to open to its full extent, and the desired divided flow rates $Q_1$ and $Q_2$ are supplied through orifices 3a and 4a provided in said shower plates 3 and 4 by adjusting the pressures $P_3'$, $P_3''$ on the downstream side of the control valves CV, with the flow rates $Q_1$ and $Q_2$ being expressed by the formulae $Q_1=C_1P_3'$ and $Q_2=C_2P_3''$ (where $C_1$ and $C_2$ are constants determined by the sectional areas of the orifice holes 3a and 4a and the gas temperature on the upstream side of the orifice), thereby supplying the total amount Q=Q1+Q2 into the chamber C.

2. A method of supplying divided gas into a chamber C from a gas supply apparatus equipped with a flow-rate control system to a chamber as claimed in claim 1, wherein the divided flow-rate control board FRC is equipped with a CPU, and is provided with a start and stop signal input terminal $T_2$, an initial flow rate ratio setting signal input terminal $T_3$, a shower plate combination indicator signal input terminal $T_4$, control flow rate signal output terminals $T_{71}$ and $T_{72}$ for the split pressure-type flow-rate controllers $FV_1$ and $FV_2$, and input/output abnormality alarm output terminals $T_{91}$ × $T_{92}$ for transmitting signals on the basis of a deviation between the flow rate setting input signals and the control flow rate output signals for the split pressure-type flow-rate controllers $FV_1$ and $FV_2$, wherein with regard to a plurality of combinations of said shower plates 3 and 4, when the gas G totalling $Q=Q_1+Q_2$ flows through the shower plates 3 and 4 respectively at the flow rate ratio $Q_1/Q_2$ the pressures $P_3'$ and $P_3''$ of gas flowing downstream of the control valves CV of the split pressure-type flow controllers $FV_1$ and $FV_2$ are calculated from $Q_1=C_1P_3'$ and $Q_2=C_2P_3''$, with the flow rate ratio $Q_1/Q_2$ being a parameter for a plurality of total flow rates Q, the initial flow rate setting signal to the split pressure-type flow-rate controller $FV_1$ having the greater flow rate is caused to be an input signal voltage Vo for full opening of the control valve, while the initial flow rate setting signal to the other split pressure-type flow-rate controller $FV_2$ is caused to be said $P_3''/P_3'$×Vo, whereafter, once a signal indicating the combination of the shower plates 3 and 4 and the ratio $P_3'/P_3''$ between the initial flow rate setting signals for said split pressure-type flow-rate controllers $FV_1$ and $FV_2$ have been inputted respectively to said input terminal $T_4$ and said initial flow rate ratio setting signal input terminal $T_3$, the flow rate Q of the gas supplied from the gas supply apparatus 1 is set at a desired flow rate with the control valves CV of the split pressure-type flow-rate controllers $FV_1$ and $FV_2$ being fully opened, whereafter an actuation (START) signal is inputted to said start signal input terminal $T_2$ (STEP 5), the existence or non-existence of said shower plate combination indicator signal and said initial flow rate ratio setting signal being verified (STEP 7) once the input of said start signal is confirmed (STEP 6), then the initial flow rate setting signals Vo/Vo×$P_3''/P_3'$ for the split pressure-type flow-rate controllers $FV_1$ and $FV_2$ obtained from said flow rate ratio setting signal are progressively increased stepwise at the same rate (STEP 8 and STEP 10), the deviation between the flow rate setting input signal and the control flow rate output signal presently observed is checked (STEP 9), if it being found that the input and output deviation is within a set range, then the flow rate setting signals to the divided flow-rate controllers $FV_1$ and $FV_2$ are reverted to their values as at one stage or step before the input-output deviation fell within said set range (STEP 11), and thereafter the flow rate setting signals for the split flow-rate controllers $FV_1$ and $FV_2$ are subjected to a ramp change at the same rate (STEP 13 and STEP 14) while the deviation between the input and output signals is continuously checked (STEP 15), and when it is found that the deviation between the input and output signals registered at the time of the ramp change is within a set range, the flow rate setting signals registered at that time are fixed and maintained as the flow rate setting signals for the split flow-rate controllers $FV_1$ and $FV_2$ (STEP 16), thereby making it possible to effect divided supply of said gas G under said flow rate setting signals.

3. A method of supplying divided gas to a chamber from a gas supply apparatus equipped with a flow-rate control system as claimed in claim 2, wherein the stepwise change of the flow rate setting signals is caused to increase both of the flow rate setting signals at the same stepwise rate from the initial flow rate setting value (100%) by 50% to 30% to 20% to 10% and 5% every 0.5 seconds.

4. A method of supplying divided gas to a chamber from a gas supply apparatus equipped with a flow-rate control system as claimed in claim 2, wherein said ramp change is effected such that both of the flow rate setting signals are increased by 10% at the same rate every 0.5 seconds.

5. A method of supplying divided gas to a chamber from a gas supply apparatus equipped with a flow-rate control system as claimed in claim 2, wherein if the deviation between the input and output stays continuously nil for more than a given period of time, then the flow rate setting signals at that moment are fixed and maintained as the flow rate signals for the flow-rate controllers $FV_1$ and $FV_2$.

6. A method of supplying divided gas to a chamber from a gas supply apparatus equipped with a flow-rate control system as claimed in claim 1, wherein the internal pressure of the chamber C is maintained at 5~30 Torr, the gas pressures on the downstream side of the split pressure-type flow-rate controllers $FV_1$ and $FV_2$ are kept at or below 100 Torr, the total flow rate Q is set at 100 sccm~1600 sccm, and the divided flow rate ratio Q1/Q2 is 1/4, 1/2, 1/1, 2/1, 3/1, or 4/1.

7. A method of supplying divided gas to a chamber from a gas supply apparatus equipped with a flow-rate control system as claimed in claim 1, wherein the initial flow rate setting signal for the one of the split pressure-type flow-rate controllers $FV_1$ or $FV_2$ having the greater divided flow rate $Q_1$ or $Q_2$ is a voltage input for full opening of the control valve CV, the control voltage input for full opening of the control valve CV having the greater divided flow rate being 0 v, and the range of the control voltage being 0~5V.

8. A method of supplying divided gas to a chamber from a gas supply apparatus equipped with a flow-rate control system as claimed in claim 2, wherein the input and output signals to the terminals of the divided flow-rate control board FRC are serial communication input and output signals.

9. A method of supplying divided gas to a chamber from a gas supply apparatus equipped with a flow-rate control system as claimed in claim 2, wherein the internal pressure of the chamber C is maintained at 5~30 Torr, the gas pressures on the downstream side of the split pressure-type flow-rate controllers $FV_1$ and $FV_2$ are kept at or below 100 Torr, the total flow rate Q is set at 100 sccm~1600 sccm, and the divided flow rate ratio Q1/Q2 is 1/4, 1/2, 1/1, 2/1, 3/1, or 4/1.

10. A method of supplying divided gas to a chamber from a gas supply apparatus equipped with a flow-rate control system as claimed in claim 2, wherein the initial flow rate setting signal for the one of the split pressure-type flow-rate controllers $FV_1$ or $FV_2$ having the greater divided flow rate $Q_1$ or $Q_2$ is a voltage input for full opening of the control valve CV, the control voltage input for full opening of the control valve CV having the greater divided flow rate being 0 v, and the range of the control voltage being 0~5V.

* * * * *